(12) United States Patent
Lee et al.

(10) Patent No.: US 9,029,043 B2
(45) Date of Patent: May 12, 2015

(54) COMPOSITE, ELECTRODE CATALYST INCLUDING THE COMPOSITE, METHOD OF PREPARING THE COMPOSITE, AND FUEL CELL INCLUDING THE COMPOSITE

(75) Inventors: Kang-hee Lee, Suwon-si (KR); Chan-ho Pak, Seoul (KR); Kyo-sung Park, Seongnam-si (KR); Seon-ah Jin, Pocheon-si (KR); Kyung-jung Kwon, Yongin-si (KR); Dae-Jong Yoo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 898 days.

(21) Appl. No.: 13/185,807

(22) Filed: Jul. 19, 2011

(65) Prior Publication Data
US 2012/0028165 A1    Feb. 2, 2012

(30) Foreign Application Priority Data

Jul. 27, 2010  (KR) .......................... 10-2010-0072485
Jul. 8, 2011   (KR) .......................... 10-2011-0067972

(51) Int. Cl.
| H01M 8/10 | (2006.01) |
| H01M 4/88 | (2006.01) |
| H01M 4/86 | (2006.01) |
| B82Y 30/00 | (2011.01) |
| H01M 4/90 | (2006.01) |

(52) U.S. Cl.
CPC ............. *H01M 4/8652* (2013.01); *B82Y 30/00* (2013.01); *H01M 4/90* (2013.01); *Y02E 60/50* (2013.01); *Y10S 977/948* (2013.01)

(58) Field of Classification Search
None
See application file for complete search history.

(56) References Cited

U.S. PATENT DOCUMENTS

| 2008/0063591 A1 | 3/2008 | Im et al. |
| 2009/0130502 A1 | 5/2009 | Liu et al. |
| 2011/0319630 A1* | 12/2011 | Yaghi et al. ................... 548/109 |

FOREIGN PATENT DOCUMENTS

| JP | 8-54618 | 2/1996 |
| JP | 2006-212469 | 8/2006 |
| JP | 2007-175578 | 7/2007 |
| KR | 10-2005-0099239 | 10/2005 |
| KR | 10-2007-0035710 | 4/2007 |
| KR | 10-2008-0091225 | 10/2008 |
| KR | 10-2009-0031358 | 3/2009 |
| KR | 10-2009-0046888 | 5/2009 |

* cited by examiner

*Primary Examiner* — Sarah A Slifka
(74) *Attorney, Agent, or Firm* — Cantor Colburn LLP

(57) ABSTRACT

A composite including a metal having oxygen-reducing activity, nitrogen and carbon, the composite comprising polyhedral particles, an electrode catalyst including the composite, a method of preparing the composite, and a fuel cell using the composite.

24 Claims, 10 Drawing Sheets

COMPOSITE, ELECTRODE CATALYST INCLUDING THE COMPOSITE, METHOD OF PREPARING THE COMPOSITE, AND FUEL CELL INCLUDING THE COMPOSITE

CROSS-REFERENCE TO RELATED APPLICATION

This application claims the benefit of Korean Patent Application Nos. 10-2010-0072485 and 10-2011-0067972, respectively filed on Jul. 27, 2010 and Jul. 8, 2011, in the Korean Intellectual Property Office, the disclosures of which are incorporated herein in their entirety by reference.

BACKGROUND OF THE INVENTION

1. Field

The present disclosure relates to a composite, an electrode catalyst comprising the composite, a method of preparing the composite, and a fuel cell including an electrode comprising the composite.

2. Description of the Related Art

According to the types of electrolyte and fuel used, fuel cells can be classified as polymer electrolyte membrane fuel cells (PEMFCs), direct methanol fuel cells (DMFCs), phosphoric acid fuel cells (PAFCs), molten carbonate fuel cells (MCFCs), and solid oxide fuel cells (SOFCs).

In general, PEMFCs and DMFCs include a membrane-electrode assembly (MEA) consisting of an anode, a cathode, and a polymer electrolyte membrane interposed between the anode and the cathode. The anode includes a catalyst layer for catalyzing the oxidation of a fuel, and the cathode includes a catalyst layer for catalyzing the reduction of an oxidant.

In general, the anode and the cathode contain catalysts including platinum (Pt) as an active component. However, Pt is an expensive precious metal, and large amounts of Pt are required in the electrode catalysts. Thus, for mass production and commercialization of fuel cells comprising these electrodes, cost reduction is required. Therefore, attempts have been made to develop non-Pt-based catalysts, as alternatives to Pt-based catalysts, for use in high-performance fuel cells.

SUMMARY OF THE INVENTION

Provided are a composite, an electrode catalyst having improved activity that comprises the composite, a method of preparing the composite, and a fuel cell including an electrode comprising the composite.

Additional aspects will be set forth in part in the description which follows and, in part, will be apparent from the description, or may be learned via practice of the presented embodiments by those skilled in the art.

According to an aspect of the invention, the composite includes a metal (M) having oxygen-reducing activity, nitrogen (N) and carbon (C), and comprises polyhedral particles.

According to another aspect of the invention, the electrode catalyst includes the above-described composite. According to another aspect of the invention, a method of preparing the above-described composite includes: mixing a salt of a metal having oxygen-reducing activity, a solvent, and a nitrogen-containing organic material to obtain a composition; mixing the composition by stirring to obtain a porous material comprising the metal having oxygen-reducing activity and the nitrogen-containing organic material; and thermally treating the porous material comprising the metal having oxygen-reducing activity and the nitrogen-containing organic material to obtain a composite comprising the metal (M) having oxygen-reducing activity, nitrogen (N) and carbon (C), and further comprising polyhedral particles.

The electrode catalyst may further comprise a support or metal catalyst particles.

According to another aspect of the invention, a fuel cell includes: an electrode containing the above-described composite; and an electrolyte membrane.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE INVENTION

Figure 1:
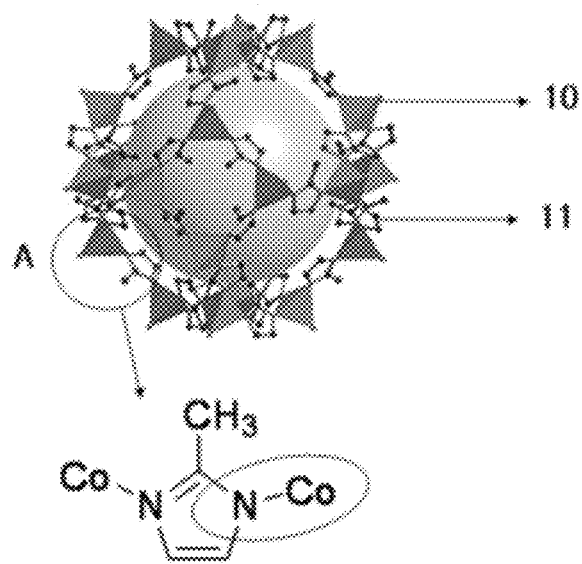
FIG. 1 is a schematic illustration of a Co-imidazolate-based porous material as an example of a porous material including an oxygen-reducing metal and an imidazolate-based material.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

According to embodiments of the invention, a composite including an oxygen-reducing metal (M), nitrogen (N) and carbon (C), and having polygonal particle shapes, and an electrode catalyst including the composite are provided.

The oxygen-reducing metal, which has oxygen-reducing activity, may include at least one metal selected from the group consisting of cobalt (Co), iron (Fe), zinc (Zn), copper (Cu), and cadmium (Cd).

The composite is a carbonization product obtained by thermally treating a porous material including the oxygen-reducing metal and a nitrogen-containing organic material.

A non-limiting example of the porous material including an oxygen-reducing metal and a nitrogen-containing organic material is a porous material including an oxygen-reducing metal and an imidazolate-based material.

The porous material including an oxygen-reducing metal and a nitrogen-containing organic material is the reaction product of a salt of a metal having oxygen-reducing activity, a solvent, and a nitrogen-containing organic material.

The nitrogen-containing organic material may be a nitrogen-containing cyclic compound. Examples of suitable nitrogen-containing organic materials include pyrrolidine, pyrroline, pyrrole, 2H-pyrrole, 3H-pyrrole, pyrazolidine, imidazolidine, 2-pyrazoline, 2-imidazoline, 1H-imidazole, triazole, isoxazole, oxazole, thiazole, isothiazole, oxadiazole, oxatriazole, dioxazole, oxazolone, oxathiazole, imidazoline-2-thione, thiadiazole, triazole, piperidine, pyridine, pyridazine, pyrimidine, pyrazine, piperazine, triazine, morpholine, thiomorpholine, indole, isoindole, indazole, benzisoxazole, benzoxazole, benzothiazole, quinoline, isoquinoline, cinnoline, quinazoline, quinoxaline, naphthyridine, phthalazine, benzoxazine, benzoadiazine, pterdine, phenazine, phenothiazine, phenoxazine, and acridine.

For example, the nitrogen-containing organic material may be an imidazole-based compound.

The porous material including an oxygen-reducing metal and a nitrogen-containing organic material may be a porous material including an oxygen-reducing metal and an imidazolate-based material. This porous material may include a unit represented by Formula 1 or 2.

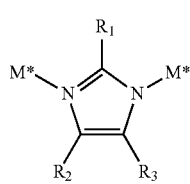

Formula 1

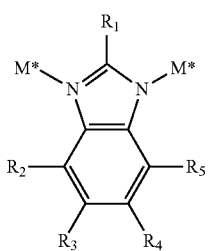

Formula 2

In Formulae 1 and 2, M is at least one metal selected from the group consisting of cobalt (Co), iron (Fe), zinc (Zn) and copper (Cu);

* indicates a linking site of the imidazolate-based moiety; and $R_1$ through $R_5$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_2$-$C_{20}$ heteroaryl group, a $C_2$-$C_{20}$ heteroaryloxy group, a halogen atom, a cyano group, or a nitro group.

In some embodiments, in FIG. 1 $R_1$ may be a hydrogen atom, a methyl group, or chlorine; $R_2$ and $R_3$ may be hydrogen atoms; and M may be Co.

Figure 2:
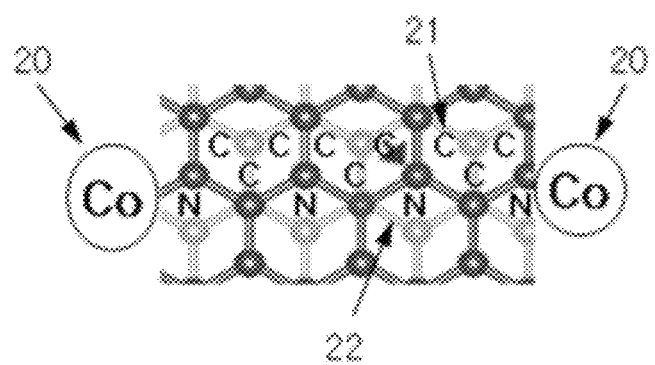
FIG. 2 is a partial schematic view of a composite obtained by carbonizing the Co-imidazolate-based porous material of FIG. 1.

In some embodiments, in FIG. 2 $R_1$ may be a hydrogen atom, a methyl group, or chlorine; $R_2$ and $R_5$ may be hydrogen atoms; and M may be Co.

The porous material including an oxygen-reducing metal and a nitrogen-containing organic material may have a pore diameter of about 0.5 to about 5 nm.

FIG. 1 is a schematic illustration of a Co-imidazolate-based porous material as an example of the porous material including an oxygen-reducing metal and an imidazolate-based material.

Referring to FIG. 1, an imidazolate-based group 11 is linked between two Co atoms 10. Referring to an enlarged inset from a region A, a strong covalent Co—N bond appears, which still remains after the carbonization of the porous material including the oxygen-reducing metal and the imidazolate-based material and serves as an active site of a catalyst support and/or a catalyst.

The porous material including an oxygen-reducing metal and an imidazolate-based material may have a pore diameter of about 0.5 to about 5 nm. For example, the porous material including an oxygen-reducing metal and an imidazolate-based material may have a pore diameter of about 1.9 nm. The porous material including an oxygen-reducing metal and an imidazolate-based material may have a pore volume of about 0.2 to about 2.5 $cm^3/g$ and a specific surface area of about 500 to about 3000 $m^3/g$.

When the pore diameter, pore volume, and specific surface area of the porous material including an oxygen-reducing metal and an imidazolate-based material are within these ranges, the electrode catalyst including this porous material will have good activity.

The amount of nitrogen in the composite may be from about 4 to about 20 atom %, as measured by X-ray photoelectron spectroscopy (XPS), and in some embodiments, may be from about 5 to about 15 atom %. For example, the amount of nitrogen may be from about 6.0 to about 7.0 atom %, and in some other embodiments, may be about 6.9 atom %.

The amount of metal in the composite may be from about 0.5 to about 5 atom %. For example, the amount of metal may be from about 1 to about 3 atom %. For example, the amount of metal may be about 2.1 atom %.

The amount of carbon in the composite may be from about 75 to about 94.5 atom %

The analysis instrument used for XPS was a Quantum 2000 scanning ESCA microprobe (Phi Physical Electronics).

The composite may have a pore diameter of about 1.5 to about 5 nm and a specific surface area of about 100 $m^2/g$ or greater. For example, the composite may have a pore diameter of about 2 to about 5 nm and a specific surface area of about 100 to about 500 $m^2/g$. When the pore diameter and specific surface area of the composite are within these ranges, the composite can be used as a catalyst support.

The composite will have high electrical conductivity with an electric resistance of from about 1.5 to about 15 mOhm/$cm^2$, and thus will be applicable in various kinds of electronic devices. The electric resistance was measured after the composite was molded under a pressure of 1400 psi.

The composite may be used as a catalyst support and a catalyst having good activity without addition of metal catalyst particles. The composite may be used as a catalyst support and as a co-catalyst. In this regard, the composite will also work as a catalyst when metal catalyst particles are further added.

According to embodiments of the invention, the electrode catalyst may be obtained by partially or completely removing the metal from the composite. This structure of the electrode catalyst will increase the catalytic activity per unit mass.

The metal may be partially or completely removed from the composite by using an inorganic acid or an organic acid.

Examples of suitable organic acids include acetic acid, citric acid, and the like. Examples of suitable inorganic acids are phosphoric acid and the like.

The amounts of organic acid and inorganic acid may vary depending on the amount of metal to be removed from the composite and processing conditions.

FIG. 2 is a partial schematic view of a composite obtained by carbonizing the Co-imidazolate based porous material of FIG. 1.

Referring to FIG. 2, the composite has a structure including nitrogen (N) 22 and carbon (C) 21 between cobalt (Co) atoms 20.

The nitrogen 22 and the carbon 21 may form a network structure as carbon-hydrogen bonds are removed by carbonization, as illustrated in FIG. 2.

The electrode catalyst will have a catalytic function without additional metal catalytic particles. The electrode catalyst is a non-platinum based catalyst having good activity. The electrode catalyst may further include metal catalytic particles or a catalyst support.

For example, the electrode catalyst may be used to form an electrode catalyst layer for fuel cells.

The metal catalytic particles may consist of at least one selected from the group consisting of palladium (Pd), iridium (Ir), manganese (Mn), gadolinium (Gd), indium (In), yttrium (Y), zirconium (Zr), tin (Sn), chromium (Cr), and vanadium (V).

When metal catalytic particles are further added, the amount of the metal catalytic particles may be from about 5 to about 70 parts by weight based on 100 parts by weight of the catalyst support. When the amount of the metal catalytic particles is within this range, the catalyst will exhibit good activity.

The catalyst support may be selected from the group consisting of ketjen black, carbon black, graphite carbon, carbon nanotubes, carbon fiber, and ordered mesoporous silica (OMS). Methods of preparing the composite and the electrode catalyst will now be described below.

Initially, a metal salt having an oxygen-reducing activity, a solvent, and a nitrogen-containing organic material are mixed to obtain a composition.

The nitrogen-containing organic material may be an imidazole-based compound.

The composition is mixed by stirring to prepare a porous material including the oxygen-reducing metal and the nitrogen-containing organic material.

The porous material including the oxygen-reducing metal and an imidazolate-based material is used as the porous material including the oxygen-reducing metal and the nitrogen-containing organic material.

The stirring may be performed at a temperature of about 20 to about 25° C. When the stirring temperature is within this range, the porous material including the oxygen-reducing metal and the nitrogen-containing organic material are obtained with a high yield.

The stirred porous material including the oxygen-reducing metal and the nitrogen-containing organic material is thermally treated and then is carbonized to form the composite.

The thermal treatment may be performed at a temperature of from about 600 to about 1100° C. When the thermal treatment temperature is within this range, the resulting composite will have good electrically conductive characteristics.

The composite may comprise polyhedral particles.

The term "polyhedral" indicates a three-dimensional structure with polygonal facets, at least one of which may have a recess.

The polyhedral three-dimensional structure may have either smooth or rough edges.

The polyhedral particles may have an edge length of about 50 to about 300 nm on average. For example, the polyhedral particles may have an average edge length of about 100 to about 200 nm. The number of edges of the polyhedral particles is not particularly limited. However, the number of edges of the polyhedral particles may be from about 6 to about 30. For example, the number of edges may be from about 12 to about 30.

The polyhedral particles may include particles having at least one shape selected from among a dodecahedronal shape and a hexahedral shape.

Figure 4:
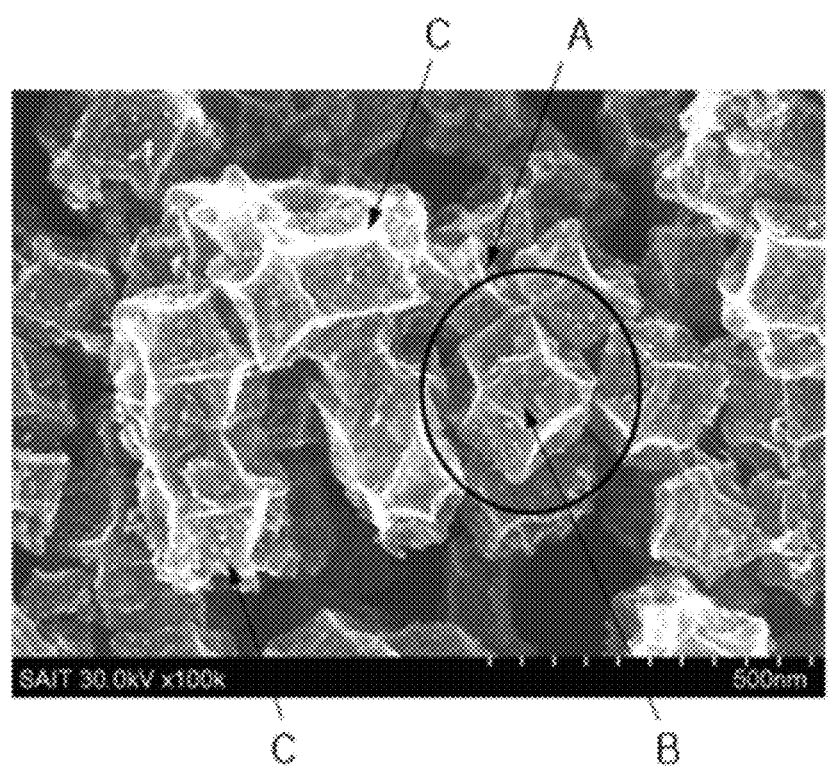
FIG. 4 is a SEM image of the Co—N—C composite according to Example 1A.

FIG. 4 shows that the composite includes polyhedral particles. FIG. 4 is a scanning electron microscopic (SEM) image of a Co—N—C composite according to an embodiment.

Referring to FIG. 4, the Co—N—C composite includes polyhedral particles A, which are secondary particles having a recess B on at least one facet of the polyhedral structure.

As shown in FIG. 4, the edges of the polyhedral particles are rough.

Primary particles C of the Co—N—C composite may have an average particle diameter of, for example, about 1 to about 80 nm.

The polyhedral particle shape of the Co—N—C composite may be identified using a scanning electron microscope (SEM) and/or a transmission electron microscope (TEM).

The polyhedral particles may be highly structurally uniform.

The composite may comprise either or both hexahedral particles and dodecahedral particles.

The imidazole-based compound may include a compound represented by Formula 3 or a compound represented by Formula 4.

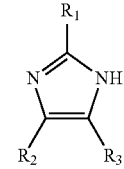

Formula 3

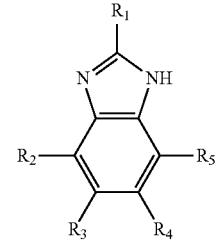

Formula 4

In Formulae 3 and 4, $R_1$ through $R_5$ may be each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_2$-$C_{20}$ heteroaryl group, a $C_2$-$C_{20}$ heteroaryloxy group, a halogen atom, a cyano group, or a nitro group.

Examples of the imidazole-based compound include compounds represented by the following formulae.

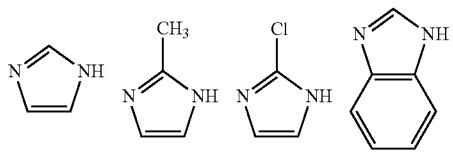

The amount of the imidazole-based compound may be from about 0.5 to about 10 moles based on 1 mole of the metal salt having oxygen-reducing activity. When the amount of the imidazole-based compound is within this range, the porous material including the oxygen-reducing metal and the nitrogen-containing organic material will be obtained with high yield. For example, the porous material including the oxygen-reducing metal and the nitrogen-containing organic material may be an imidazolate-based porous material.

The metal salt having oxygen-reducing activity may include at least one material selected from the group consisting of cobalt nitrate, cobalt chloride, cobalt acetate, cobalt sulfate, cobalt oxide, iron nitrate, iron chloride, iron acetate, iron sulfate and iron oxide The solvent may be any solvent capable of dissolving the salt of the metal having oxygen-reducing activity and the nitrogen-containing organic material. Examples of the solvent include methanol, ethanol, dimethylformamide, dimethylacetamide, acetone, water, diethylformamide, dibutylformamide, and the like.

The amount of the solvent may be from about 500 to about 100,000 parts by weight based on 100 parts by weight of the metal salt having oxygen-reducing activity. When the amount of the solvent is within this range, all the components will be uniformly thoroughly dispersed and mixed in the composition.

The electrode catalyst prepared through the processes described above may be used as a catalyst with catalytic function, which may be used subtantially as a catalyst without the addition of metal catalytic particles.

In the method of preparing the electrode catalyst, after the thermal treatment for forming the composite is performed, an acid treatment may be further performed. The acid treatment may be performed using an organic acid such as acetic acid or citric acid, or an inorganic acid such as phosphoric acid.

Due to the acid treatment, the metal of the composite is partially or completely removed so that a catalyst support is obtained. Metal catalytic particles may be further incorporated into the catalyst support to obtain a catalyst.

The above-described methods of preparing the composite and the electrode catalyst are simple, easy and economically efficient.

The catalyst support and catalyst according to embodiments may be used in portable devices such as laptops and mobile phones, vehicle such as automobiles and buses, and home use fuel cells.

For example, the catalyst support and the catalyst prepared using the catalyst support may be used to manufacture a polymer electrolyte membrane fuel cell (PEMFC), a phosphoric acid fuel cell (PAFC) or a direct methanol fuel cell (DMFC), which includes an electrode catalyst layer formed using the catalyst support and the catalyst.

Hereinafter, a fuel cell using the catalyst support and/or the catalyst will now be described in detail.

According to embodiments of the invention, the fuel cell includes a cathode, an anode, and an electrolyte membrane between the cathode and the anode. At least one of the cathode and the anode may include at least one of the catalyst support and the catalyst described above.

For example, the cathode may include at least one of the catalyst support and the catalyst described above.

When the fuel cell including the catalyst support and the catalyst is operated for a long time or at high temperatures, the activity of the electrode catalyst remains high.

The fuel cell may be implemented as, for example, a PEMFC, or a DMFC.

Figure 12:
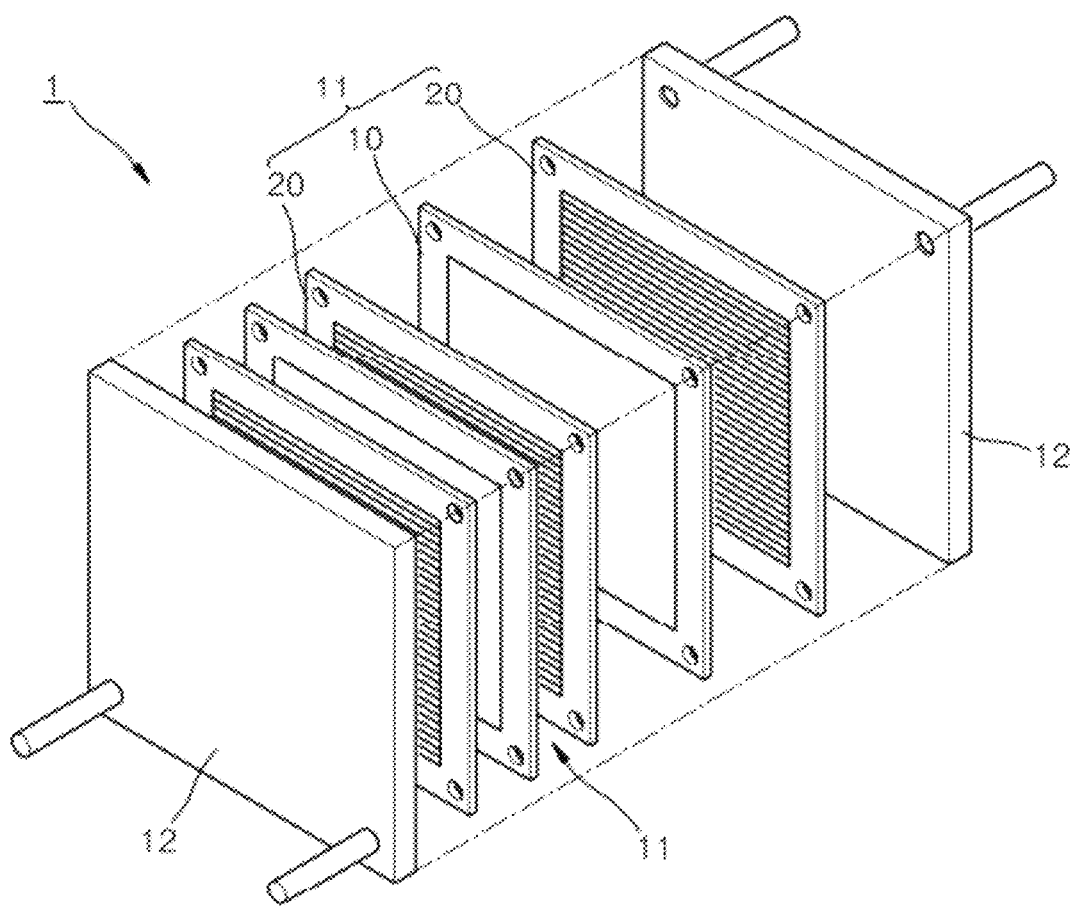
FIG. 12 is a perspective exploded view of a fuel cell according to an embodiment of the invention.
Figure 13:
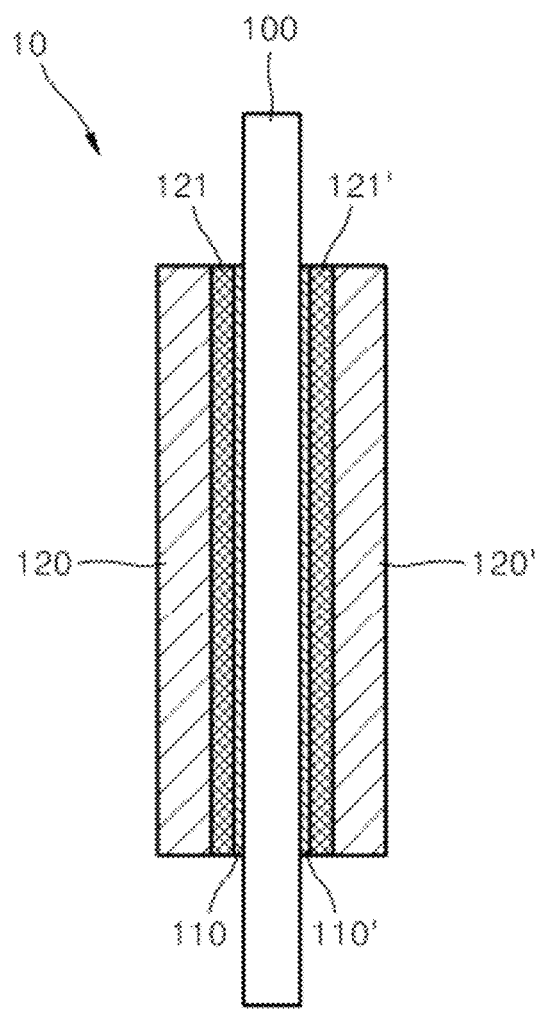
FIG. 13 is a cross-sectional diagram of a membrane-electrode assembly included in the fuel cell of FIG. 12.

FIG. 12 is an exploded perspective view of a fuel cell 1 according to an embodiment. FIG. 13 is a cross-sectional view of a membrane-electrode assembly (MEA) 10 of the fuel cell 1 of FIG. 12.

Referring to FIG. 12, the fuel cell 1 includes two unit cells 11 that are supported by a pair of holders 12. Each unit cell 11 includes an MEA 10, and bipolar plates 20 and 20 disposed on lateral sides of the MEA 10. The bipolar plates 20 include a conductive metal, carbon or the like, and function as current collectors while providing oxygen and fuel to the catalyst layers of the MEAs 10.

Although only two unit cells 11 are shown in FIG. 12, the number of unit cells is not limited to two and a fuel cell may have several tens or hundreds of unit cells, depending on the required properties of the fuel cell.

Referring to FIG. 13, each MEA 10 includes an electrolyte membrane 100, catalyst layers 110 and 110' including the electrode catalyst according to embodiments of the invention and respectively disposed on either side of the electrolyte membrane 100 in the thickness direction thereof are; first, gas diffusion layers 121 and 121' respectively stacked on the catalyst layers 110 and 110' and; second, gas diffusion layers 120 and 120' respectively stacked on the first gas diffusion layers 121 and 121'.

The catalyst layers 110 and 110' respectively function as a fuel electrode and an oxygen electrode, each including a catalyst and a binder therein. The catalyst layers 110 and 110' may further include a material that increases the electrochemical surface area of the catalyst.

The first gas diffusion layers 121 and 121' and the second gas diffusion layers 120 and 120' may each be formed of a material such as, for example, carbon sheet or carbon paper. The first gas diffusion layers 121 and 121' and the second gas diffusion layers 120 and 120' diffuse oxygen and fuel supplied through the bipolar plates 20 into the entire surfaces of the catalyst layers 110 and 110'.

The fuel cell 1 including the MEA 10 typically operates at a temperature of 100 to 300° C. Fuel such as hydrogen is supplied through one of the bipolar plates 20 into a first catalyst layer, and an oxidant such as oxygen is supplied through the other bipolar plate 20 into a second catalyst layer. Then, hydrogen is oxidized into protons in the first catalyst layer, and the protons are conducted to the second catalyst layer through the electrolyte membrane 100. Then, the protons electrochemically react with oxygen in the second catalyst layer to produce water and generate electrical energy. Hydrogen produced by reforming hydrocarbons or alcohols may be used as the fuel. Oxygen as the oxidant may be supplied in the form of air.

The substituents used herein are defined as follows.

The alkyl group used herein may be methyl, ethyl, propyl, isobutyl, sec-butyl, pentyl, iso-amyl, hexyl, or the like. At least one hydrogen atom of the alkyl group may be substituted with a halogen atom, a $C_1$-$C_{20}$ alkyl group substituted with a halogen atom (for example, $CCF_3$, $CHCF_2$, $CH_2F$, $CCl_3$, and the like), a hydroxyl group, a nitro group, a cyano group, an amino group, an amidino group, hydrazine, hydrozone, a carboxyl group or a salt thereof, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_1$-$C_{20}$ heterocyclic group, or a $C_6$-$C_{20}$ heteroarylalkyl group.

The alkoxy group used herein may be methoxy, ethoxy, propoxy or the like. At least one hydrogen atom of the alkoxy group may be substituted with the same substituent as in the alkyl groups described above.

The aryl group used herein is used alone or in combination, and refers to an aromatic system containing at least one ring. The term "aryl" refers to an aromatic radical, including phenyl, naphthyl, tetrahydronaphthyl, or the like. The aryl group may have a substituent such as haloalkylene, nitro, cyano, alkoxy and lower alkylamino. At least one hydrogen atom of the aryl group may be substituted with the same substituent as in the alkyl groups described above.

The aryloxy group used herein may be phenoxy or the like. At least one hydrogen atom of the aryloxy group may be substituted with the same substituent as in the alkyl groups described above.

The heteroaryl group used herein refers to an organic compound which contains at least one hetero atom selected from the group consisting of N, O, P, and S, and also has carbon atoms. At least one hydrogen atom of the heteroaryl group may be substituted with the same substituent as in the alkyl groups described above.

At least one hydrogen atom of the heteroaryloxy group may be substituted with the same substituent as in the alkyl groups described above.

Hereinafter, one or more embodiments of the invention will be described in detail with reference to the following examples. These examples are not intended to limit the purpose and scope of the one or more embodiments of the invention.

Example 1A

Preparation of Co—N—C Composite 12 g of 1,2-methylimidazole and 4 g of $Co(NO_3)_2.6H_2O$ were dissolved in 600 ml of methanol to obtain a composition.

The composition was stirred at 25° C. for about 8 hours. A solid component was isolated from the composition by centrifugation, and the isolated solid component was washed with methanol and then dried into a powder form.

The dry powder was thermally treated at about 800° C. in a nitrogen atmosphere for carbonization to obtain a Co—N—C composite.

Shapes of the Co—N—C composite obtained through the processes described above were analyzed using a scanning electron microscope (SEM). The results are shown in FIG. 4.

Figure 3:
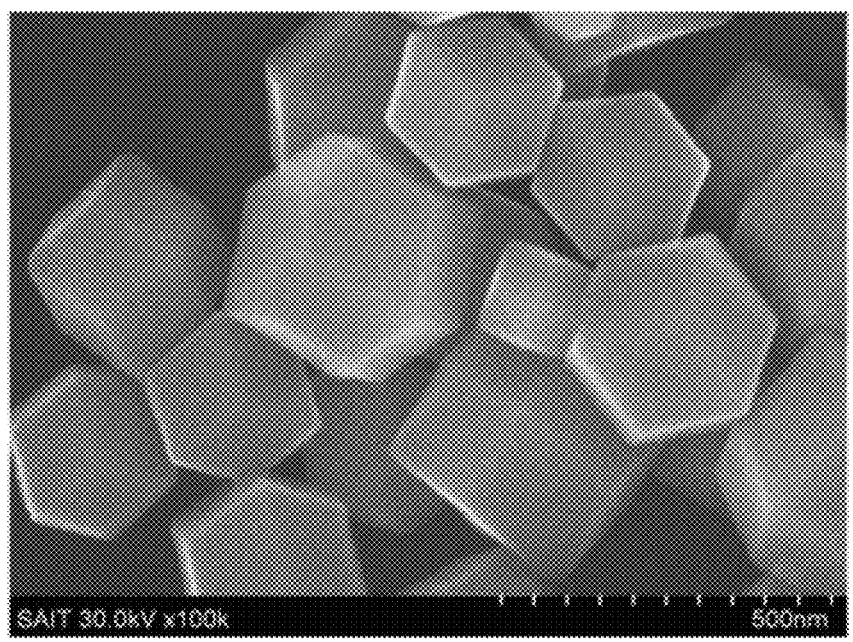
FIG. 3 is a scanning electron microscopic (SEM) image showing shapes of a Co—N—C composite of FIG. 4 in a powder form before thermal treatment at about 800° C. in a nitrogen atmosphere.

FIG. 3 is a SEM image showing shapes of the Co—N—C composite of FIG. 4 in a powder form before the thermal treatment at about 800° C. in a nitrogen atmosphere.

Referring to FIG. 3, the Co—N—C composite of FIG. 4 maintained its original crystalline structure and polyhedral particle shapes even after the carbonization. The polyhedral particles of the Co—N—C composite included both dodecahedral particles and hexahedral particles.

Figure 5:
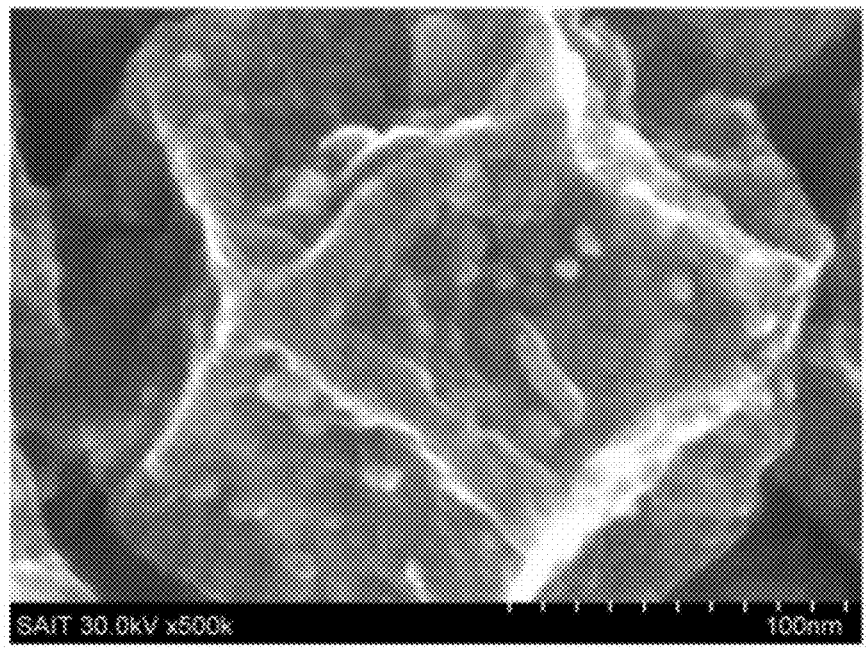
FIGS. 5 and 6 are enlarged views of the Co—N—C composite of FIG. 3, respectively, illustrating dodecahedral and hexahedral particles.
Figure 6:
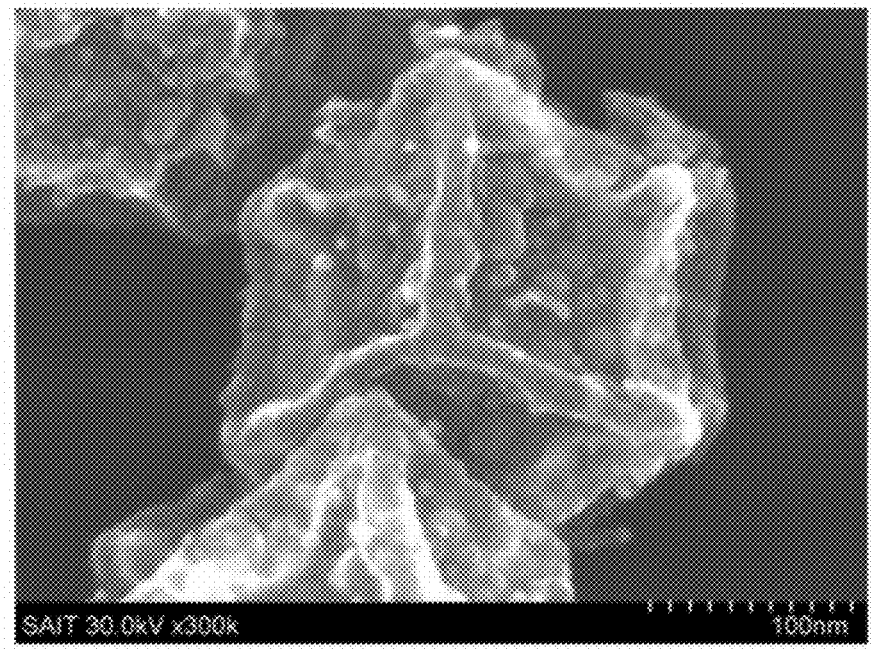

FIGS. 5 and 6 are enlarged views of the Co—N—C composite of FIG. 4, respectively, illustrating dodecahedral and hexahedral particles. Referring to FIGS. 5 and 6, the dodecahedral and hexahedral particles have an edge length of about 100 to about 150 nm.

Figure 7:
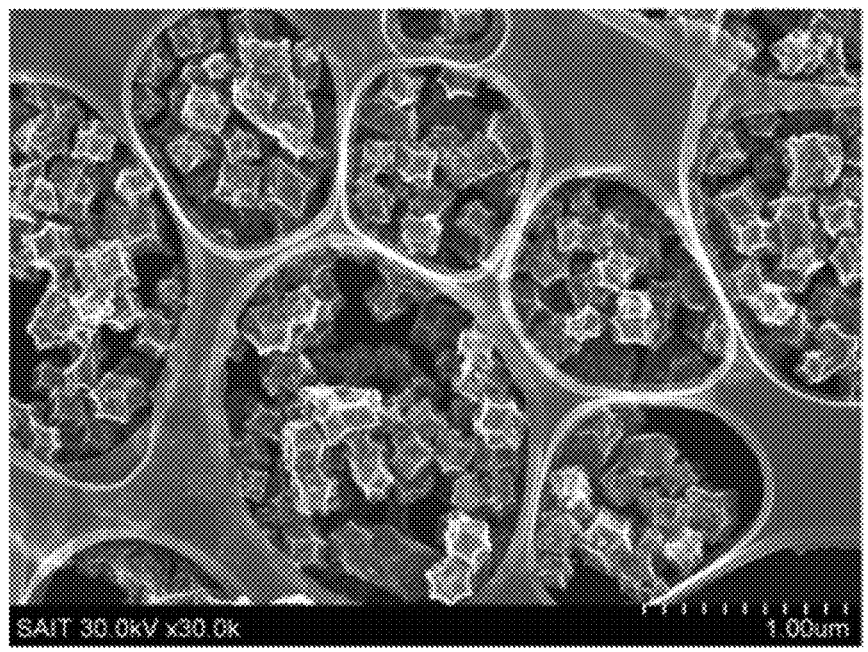
FIG. 7 is a SEM image of a Co—N—C composite according to Example 1A.

FIG. 7 is a SEM image of the Co—N—C composite of Example 1A, illustrating that Co—N—C composite particles are mostly polyhedral and are highly structurally uniform.

The thermal decomposition characteristics of the Co—N—C material of Example 1A were measured. The results are shown in FIG. 8.

Figure 8:
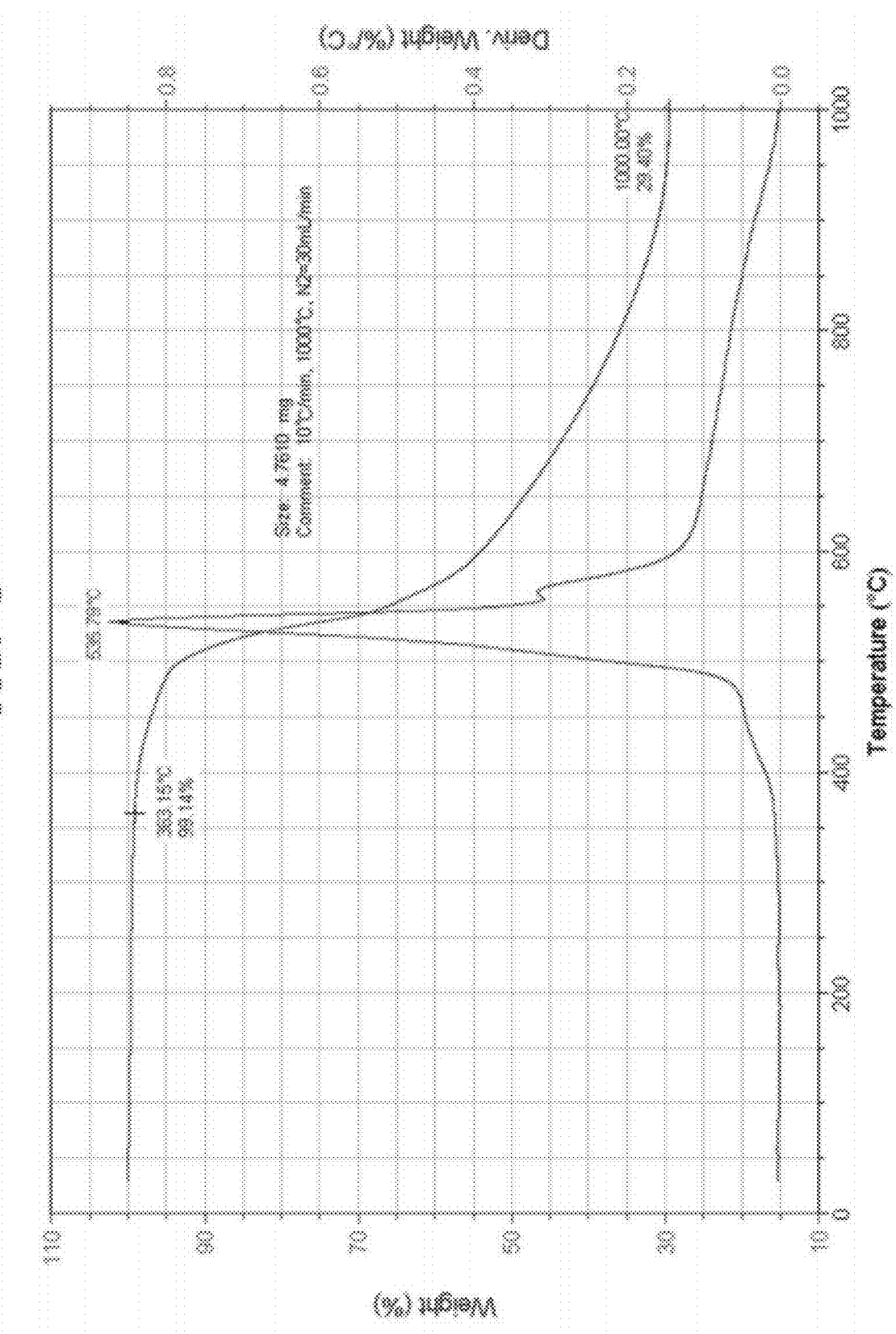
FIG. 8 is a graph showing thermal decomposition characteristics of the Co—N—C composite according to Example 1A.

Referring to FIG. 8, the thermal decomposition temperature of the Co—N—C composite is about 500-800° C.

Example 1B

Co—N—C Composite

A Co—N—C composite was prepared in the same manner as in Example 1A, except that the dry powder was thermally treated at about 500° C. in a nitrogen atmosphere.

Example 1C

Co—N—C Composite

A Co—N—C composite was prepared in the same manner as in Example 1A, except that the dry powder was thermally treated at about 600° C. in a nitrogen atmosphere.

Example 1D

Co—N—C Composite

A Co—N—C composite was prepared in the same manner as in Example 1A, except that the dry powder was thermally treated at about 700° C. in a nitrogen atmosphere.

Example 1E

Co—N—C Composite

A Co—N—C composite was prepared in the same manner as in Example 1A, except that the dry powder was thermally treated at about 900° C. in a nitrogen atmosphere.

Example 1F

Co—N—C Composite

A Co—N—C composite was prepared in the same manner as in Example 1A, except that the dry powder was thermally treated at about 1100° C. in a nitrogen atmosphere.

Comparative Example 1

Preparation of Carbonaceous Compound Including Cobalt and Porphyrin 1 g of cobalt tetraphenyl porphyrin was dissolved in 300 ml of tetrahydrofuran (THF), and 1 g of ketjen black carbon as a carbonaceous compound was added into the solution.

The solvent was removed from the mixture using a rotary evaporator. Then, the resultant product was dried at 80° C. and then ground into powder.

The ground powder was thermally treated at about 800° C. to obtain a carbonaceous compound (Co-Porphyrin/C) including Co and porphyrin.

Comparative Example 2

Preparation of Mesoporous Carbon Containing Co and N 1 g of phenanthroline and 0.5 g of p-toluene sulfonic acid were mixed, and 1 g of Co(NO$_3$)$_2$.6H$_2$O was added to the mixture. Then, 2 g of MSU-H as an ordered mesoporous silica (OMS) template was impregnated with the mixture.

The resulting product was dried at 80° C. and 160° C.

The resulting product was thermally treated at about 900° C. in a nitrogen gas atmosphere. Then, the OMS template was removed using a 50 wt % hydrofluoric acid (HF) solution to obtain a mesoporous carbon (Co—N—OMC) containing Co and N.

The nitrogen adsorption and desorption characteristics of the Co—N—C composite of Example 1A were analyzed. The results are shown in FIG. 11.

Figure 11:
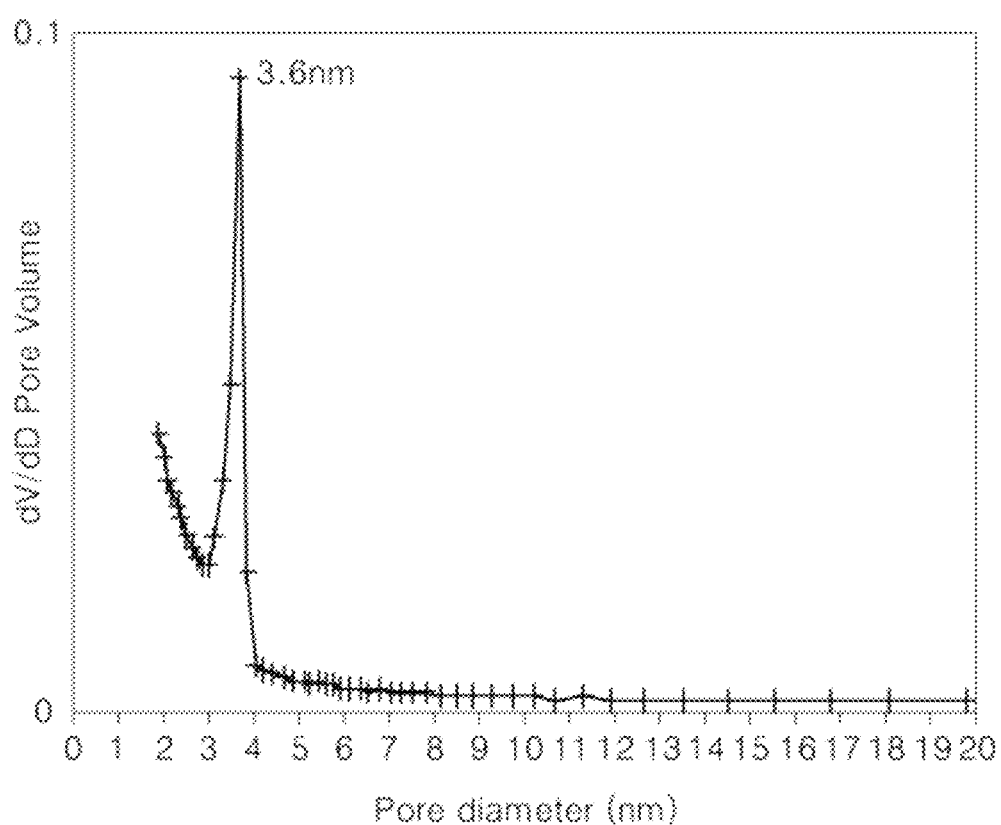
FIG. 11 is a graph of nitrogen absorption and desorption isotherms of a Co—N—C composite prepared according to Example 1A.

Referring to FIG. 11, the Co—N—C composite has an average particle diameter of about 3.6 nm, uniform distribution of pores, and a large surface area of about 300 m$^2$/g. These results support the fact that the Co—N—C composite has a pore size and surface area suitable for use as a catalyst support.

The Brunauer-Emmett-Tellr (BET) specific surface area and pore volume of the composite of Example 1A were measured.

The BET specific surface area and pore diameter of the composite of Example 1A were found to be about 306 m$^2$/g and about 3.6 nm, respectively.

The BET specific surface area was measured by a nitrogen absorption and desorption analysis.

Evaluation Example 1A

Manufacture of Half Cell 0.1 g of polyvinylidene fluoride (PVDF) and n-methylpyrrolidone (NMP) were mixed with 1 g of the Co—N—C composite of Example 1A to obtain a slurry for forming a rotating disk electrode (RDE). The slurry was loaded onto a glassy carbon film used as a substrate of the RDE, and then a drying process was performed while incrementally raising the temperature from room temperature to 150° C. to manufacture the RDE. The performance of the catalyst was evaluated using the RDE as a working electrode.

Evaluation Example 1B

Manufacture of Electrode

An electrode was manufactured in the same manner as in Evaluation Example 1A, except that the Co—N—C composite of Example 1B was used, instead of the Co—N—C composite of Example 1A.

Evaluation Example 1C

Manufacture of Electrode

An electrode was manufactured in the same manner as in Evaluation Example 1A, except that the Co—N—C composite of Example 1C was used, instead of the Co—N—C composite of Example 1A.

Evaluation Example 1C

Manufacture of Electrode

An electrode was manufactured in the same manner as in Evaluation Example 1A, except that the Co—N—C composite of Example 1D was used, instead of the Co—N—C composite of Example 1A.

Evaluation Example 1E

Manufacture of Electrode

An electrode was manufactured in the same manner as in Evaluation Example 1A, except that the Co—N—C composite of Example 1E was used, instead of the Co—N—C composite of Example 1A.

Evaluation Example 1F

Manufacture of Electrode

An electrode was manufactured in the same manner as in Evaluation Example 1A, except that the Co—N—C composite of Example 1F was used, instead of the Co—N—C composite of Example 1A.

Electric resistances of the composites prepared in Examples 1A and 1F were measured. The results are shown in Table 1 below. For comparison, the electric resistance of ketjen black is represented along with the electric resistance of the composites of Examples 1A and 1F. Each composite and ketjen black were molded under a pressure of about 1,400 psi to measure the electric resistances

TABLE 1

| Example | Electric resistance (mOhm/cm$^2$) |
|---|---|
| Example 1A | 11.9 |
| Example 1F | 1.7 |
| Ketjen Black | 77.7 |

Referring to Table 1, the composites of Examples 1A and 1F are found to have very low electric resistance relative to ketjen black, which indicates the composites of Examples 1A and 1F have high electric conductivity compared to ketjen black.

Comparative Evaluation Example 1-2

Electrodes were manufactured in the same manner as in Evaluation Example 1A, except that the Co- and porphyrin-containing carbonaceous compound of Comparative Example 1 and the Co- and N-containing mesoporous carbon of Comparative Example 2 were respectively used, instead of the composite of Evaluation Example 1A.

Figure 9:
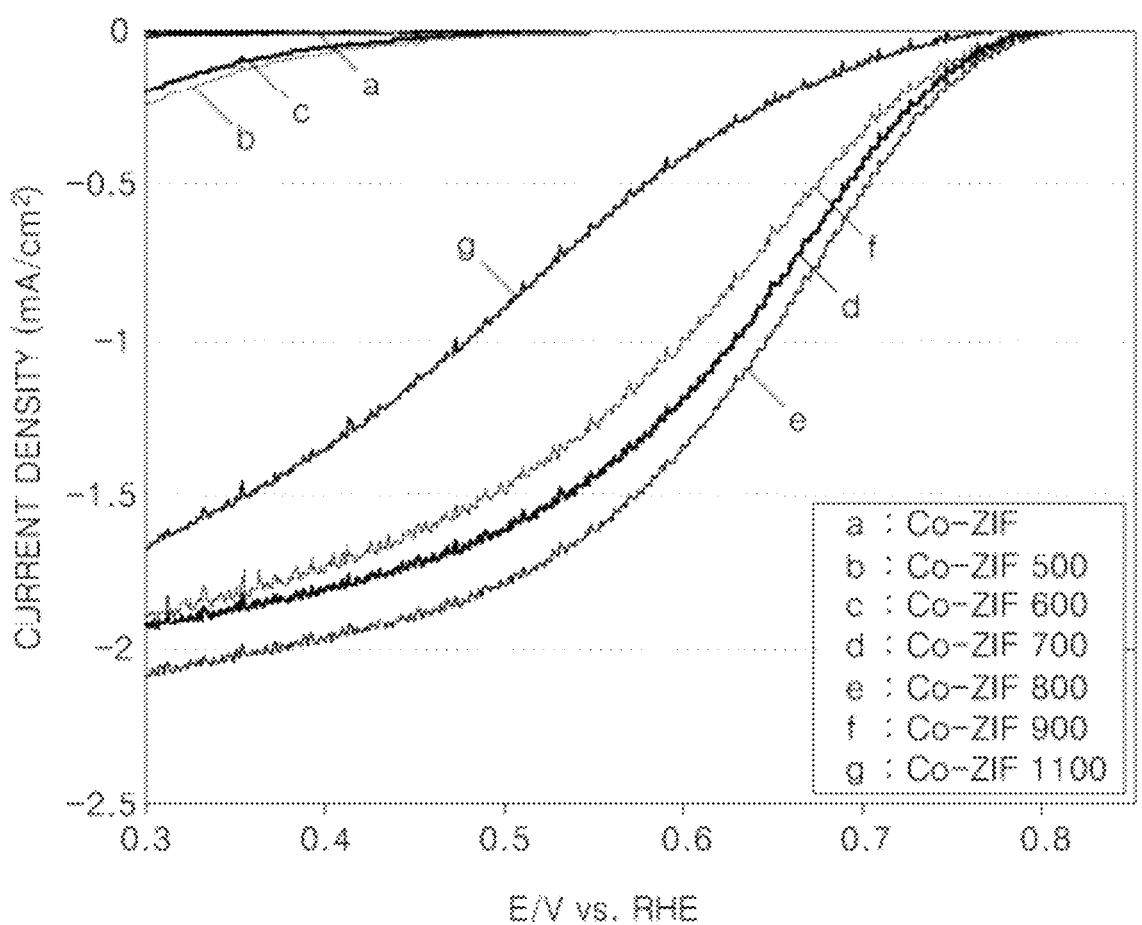
FIG. 9 is a graph showing oxygen reduction reaction (ORR) activities of fuel cells manufactured according to Evaluation Examples 1A-1F.
Figure 10:
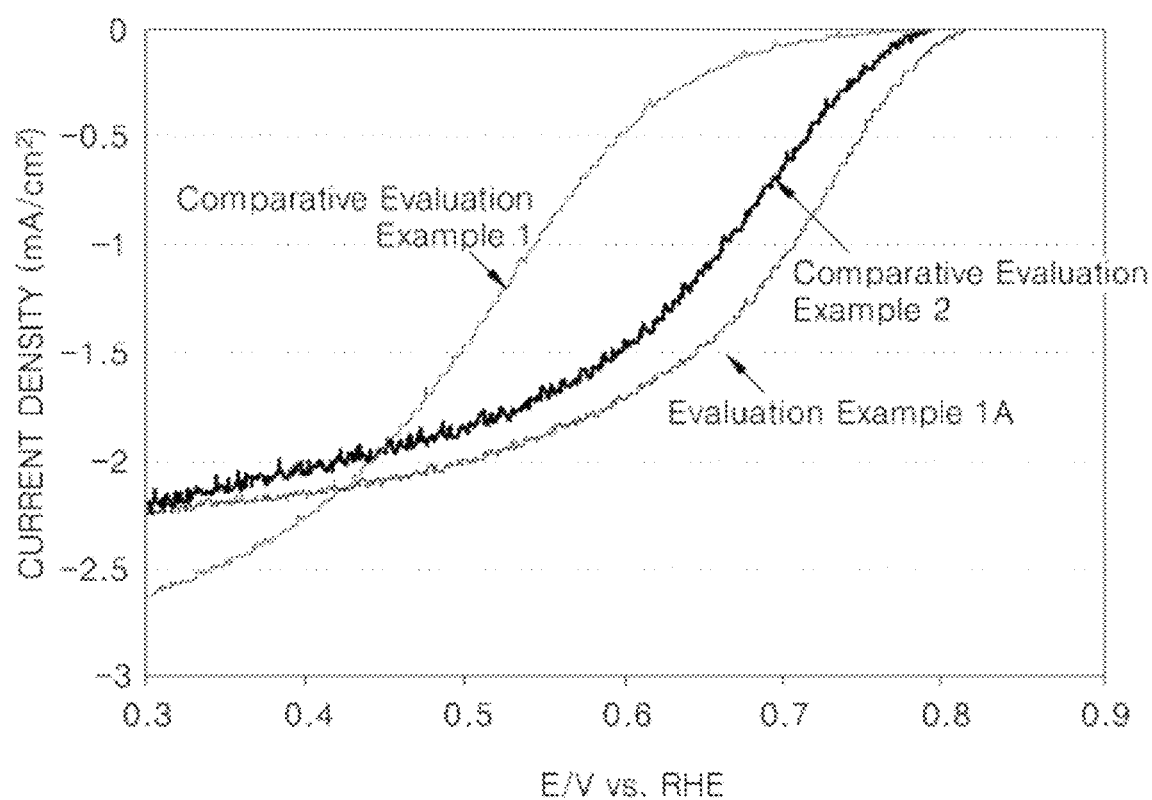
FIG. 10 is a graph showing the ORR activity of the fuel cell of Evaluation Example 1A.

The oxygen reduction reaction (ORR) activities of the fuel cells of Evaluation Example 1A-1F were measured using a 1M HClO$_4$ solution saturated with oxygen. The results are shown in FIG. 10. The ORR activities were measured using a rotating disk electrode (RDE) method in which the oxygen reduction reaction was conducted at a voltage of 0 to 1.0V (scan rate: about 5 mV/S) and current density values at a voltage of 0.6 to 0.8V were measured for comparison. The larger the absolute values of the current densities, the better the ORR activity. In FIG. 9, RHE refers to a normal hydrogen electrode. The rounds per minute of the RDE were about 1600 rpm.

In FIG. 9, Co-ZIF indicates an electrode sample before carbonization, Co-ZIF 800 indicates the electrode of Evaluation Example 1A, Co-ZIF 500 indicates the electrode of Evaluation Example 1B, Co-ZIF 600 indicates the electrode of Evaluation Example 1C, Co-ZIF 900 indicates the electrode of Evaluation Example 1E, and Co-ZIF 1100 indicates the electrode of Evaluation Example 1F.

Referring to FIG. 10, the ORR activity of the electrode of Evaluation Example 1A is better than those of the electrodes of Evaluation Examples 1B-1F.

The ORR activities of the fuel cells manufactured according to Evaluation Example 1A, Comparative Evaluation Example 1, and Comparative Evaluation Example 2 were measured in the same manner as in Evaluation Examples 1A-1F. The results are shown in FIG. 10.

Referring to FIG. 10, the absolute value of the oxygen reduction current at a working voltage of 0.7V of the fuel cell of Evaluation Example 1A is larger than those of the fuel cells of Comparative Evaluation Example 1 and Comparative Evaluation Example 2. This result indicates that the electrode of Evaluation Example 1A has better ORR activity than the electrodes of Comparative Evaluation Example 1 and Comparative Evaluation Example 2.

In FIGS. 10 and 11, the Y-axis represents current density, and the X-axis represents RHE (a reversible hydrogen electrode).

The Co—N—C composite of Example 1A was analyzed using X-ray photoelectron spectroscopy (XPS). The results are shown in Table 1. The XPS was performed using a Quantum 2000 scanning ESCA microprobe (Phi Physical Electronics).

The ORR onset voltage of the electrode manufactured according to Evaluation Example 1A is also shown in Table 2. An ORR onset voltage indicates a voltage at which ORR begins.

TABLE 2

| | Amount (atom %) | | |
|---|---|---|---|
| | Co | N | ORR onset voltage (V) |
| Example 1A | 2.1 | 6.9 | 0.82 |

As is apparent from Table 2, the electrode catalyst prepared in Example 1A has good ORR onset voltage characteristics.

As described above, according to the one or more of the above embodiments of the present invention, a composite having high electrical conductivity is provided. By using the composite, an electrode catalyst including mesoporous pores with a large surface area is obtained. The electrode catalyst exhibits improved ORR activity. In addition, a fuel cell with improved efficiency can be manufactured using an electrode including the electrode catalyst.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A composite comprising a metal (M) having oxygen-reducing activity, nitrogen (N) and carbon (C), the composite comprising polyhedral particles, wherein the polyhedral particles have an average edge length of from about 50 to about 300 nm.

2. The composite of claim 1, wherein each of the polyhedral particles may have a recess on at least one facet thereof.

3. The composite of claim 1, wherein the polyhedral particles have at least one shape selected from a dodecahedronal shape and a hexahedral shape.

4. The composite of claim 1, wherein the metal having oxygen-reducing activity comprises at least one metal (M) selected from the group consisting of cobalt (Co), iron (Fe), zinc (Zn), cadmium (Cd) and copper (Cu).

5. The composite of claim 1, wherein the amount of nitrogen (N) is from about 5 to about 20 atom %.

6. The composite of claim 1, wherein the amount of the metal (M) is from about 0.5 to about 5.0 atom %.

7. The composite of claim 1, wherein the composite has a pore diameter of from about 1.5 to about 5 nm.

8. The composite of claim 1, wherein the composite comprises a carbonization product of a porous material comprising the metal having oxygen-reducing activity and a nitrogen-containing organic material.

9. The composite of claim 8, wherein the nitrogen-containing organic material comprises at least one selected from the group consisting of pyrrolidine, pyrroline, pyrrole, 2H-pyrrole, 3H-pyrrole, pyrazolidine, imidazolidine, 2-pyrazoline, 2-imidazoline, 1H-imidazole, triazole, isoxazole, oxazole, thiazole, isothiazole, oxadiazole, oxatriazole, dioxazole, oxazolone, oxathiazole, imidazoline-2-thione, thiadiazole, triazole, piperidine, pyridine, pyridazine, pyrimidine, pyrazine, piperazine, triazine, morpholine, thiomorpholine, indole, isoindole, indazole, benzisoxazole, benzoxazole, benzothiazole, quinoline, isoquinoline, cinnoline, quinazoline, quinoxaline, naphthyridine, phthalazine, benzoxazine, benzoadiazine, pterdine, phenazine, phenothiazine, phenoxazine, and acridine.

10. The composite of claim 8, wherein the porous material comprising the metal having oxygen-reducing activity and the nitrogen-containing organic material comprises a porous material comprising the metal having oxygen-reducing activity and an imidazolate-based material.

11. The composite of claim 8, wherein the porous material comprising the metal having oxygen-reducing activity and an imidazolate-based material comprises a unit represented by Formula 1 or 2 below:

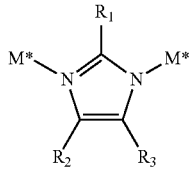

Formula 1

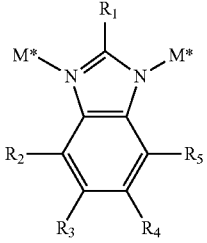

Formula 2 wherein, in Formulae 1 and 2, M is at least one selected from the group consisting of cobalt (Co), iron, (Fe), zinc (Zn), cadmium (Cd) and copper (Cu);

* indicates a linking site of an imidazo late-based material; and $R_1$ to $R_5$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_2$-$C_{20}$ heteroaryl group, a $C_2$-$C_{20}$ heteroaryloxy group, a halogen atom, a hydroxyl group, a cyano group, or a nitro group.

12. The composite of claim 11, wherein, in Formulae 1 and 2, $R_1$ is a hydrogen atom, a methyl group, or chlorine; $R_2$ and $R_3$ are hydrogen atoms; and M is cobalt (Co).

13. The composite of claim 8, wherein the porous material comprising the metal having oxygen-reducing activity and the nitrogen-containing organic material comprises the reaction product of a salt of the metal having oxygen-reducing activity, a solvent, and the nitrogen-containing organic material.

14. The composite of claim 1, wherein the composite has an electric resistance of from about 1.5 to about 15 mOhm/cm².

15. An electrode catalyst comprising the composite of claim 1.

16. The electrode catalyst of claim 15, further comprising metal catalyst particles.

17. The electrode catalyst of claim 15, further comprising a support.

18. A method of preparing the composite of claim 1 comprising:
  combining a salt of a metal having oxygen-reducing activity, a solvent, and a nitrogen-containing organic material to obtain a composition;
  mixing the composition to obtain a porous material comprising the metal having oxygen-reducing activity and the nitrogen-containing organic material; and
  thermally treating the porous material comprising the metal having oxygen-reducing activity and the nitrogen-containing organic material to obtain a composite comprising the metal (M) having oxygen-reducing activity, nitrogen (N) and carbon (C), and further comprising polyhedral particles.

19. The method of claim 18, wherein the mixing of the composition is performed at a temperature of about 20 to about 25° C.

20. The method of claim 18, wherein the thermal treatment of the porous material is performed at a temperature of about 600 to about 1100° C.

21. The method of claim 18, wherein the nitrogen-containing organic material comprises an imidazole-based compound represented by Formula 3 or 4 below, and the amount of the nitrogen-containing organic material is from about 0.5 to about 20 moles with respect to 1 mole of the salt of the metal having oxygen-reducing activity:

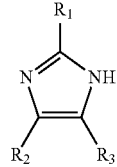

Formula 3

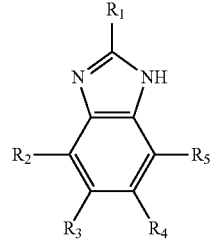

Formula 4 wherein, in Formulae 3 and 4, $R_1$ to $R_5$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_2$-$C_{20}$ heteroaryl group, a $C_2$-$C_{20}$ heteroaryloxy group, a halogen atom, a hydroxyl group, a cyano group, or a nitro group.

22. The method of claim 18, wherein the salt of the metal having oxygen-reducing activity comprises at least one selected from the group consisting of cobalt nitrate, cobalt chloride, cobalt acetate, cobalt sulfate, cobalt oxide, iron nitrate, iron chloride, iron acetate, iron sulfate, and iron oxide.

23. The method of claim 18, further comprising treating the composite with an acid after thermally treating the porous material.

24. A fuel cell comprising: an electrode comprising the composite of claim 1; and an electrolyte membrane.

* * * * *